United States Patent
Kitaura et al.

(10) Patent No.: US 6,469,977 B2
(45) Date of Patent: Oct. 22, 2002

(54) OPTICAL INFORMATION RECORDING MEDIUM, METHOD FOR PRODUCING THE SAME, AND METHOD AND APPARATUS FOR RECORDING/REPRODUCING INFORMATION THEREON

(75) Inventors: Hideki Kitaura, Kyoto; Noboru Yamada, Osaka, both of (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/739,412

(22) Filed: Dec. 18, 2000

(65) Prior Publication Data

US 2001/0005350 A1 Jun. 28, 2001

(30) Foreign Application Priority Data

Dec. 20, 1999 (JP) .............................. 11-360998

(51) Int. Cl.[7] .................................. G11B 7/00
(52) U.S. Cl. .................... 369/275.1; 369/100; 369/47.1
(58) Field of Search ................. 369/47.1, 53.1, 369/53.41, 59.1, 93, 94, 275.1, 275.2, 275.4, 100

(56) References Cited

U.S. PATENT DOCUMENTS

| 5,273,861 A | 12/1993 | Yamada et al. |
| 5,431,978 A | 7/1995 | Nakamura et al. |
| 5,726,969 A | 3/1998 | Moriya et al. |
| 5,764,619 A | 6/1998 | Nishiuchi et al. |
| 5,812,182 A | * 9/1998 | Kawai .................. 347/262 |
| 5,922,177 A | * 7/1999 | Iketani et al. ......... 369/275.2 X |

FOREIGN PATENT DOCUMENTS

| EP | 860 295 | 8/1998 |
| EP | 957 477 | 11/1999 |
| JP | 1-149238 | 6/1989 |
| JP | 7-105574 | 4/1995 |
| JP | 7-78354 | 5/1995 |
| JP | 7-262607 | 10/1995 |
| JP | 9-212917 | 8/1997 |
| JP | 10-505188 | 5/1998 |
| JP | 2000-36130 | 2/2000 |

OTHER PUBLICATIONS

"Potential of Ge–Sb–Te Phase–change Optical Disks for High–Data–Rate Recording"; Yamada, Noboru; Proceedings of SPIE, vol. 3109 .

"Wave Optics"; Hirosh Kubota et al.; Iwanami Shoten, 1971; with partial English translation.

* cited by examiner

*Primary Examiner*—Muhammad Edun
(74) *Attorney, Agent, or Firm*—Merchant & Gould P.C.

(57) ABSTRACT

The present invention provides an optical information recording medium includes a first information layer, a separating layer, a second information layer and a second substrate in this order on a first substrate. The first information layer comprises a multilayered thin film including a lower protective layer, a recording layer, an upper protective layer, a reflective layer and a transmittance improving layer in this order from the side near the first substrate. The reflectance in a mark portion formed at the time of focusing and irradiating the light beams incident from the first substrate side on the first information layer is higher than that in a space portion where no mark is formed, and 40% or more of the light beams pass through the first information layer and reach the second information layer.

12 Claims, 4 Drawing Sheets

OPTICAL INFORMATION RECORDING MEDIUM, METHOD FOR PRODUCING THE SAME, AND METHOD AND APPARATUS FOR RECORDING/REPRODUCING INFORMATION THEREON

BACKGROUND OF THE INVENTION

1. Field of the Invention

The present invention relates to an optical information recording medium that allows information signals to be recorded/reproduced with high quality by irradiating a thin film formed on a substrate with a high energy beam such as a laser beam, a method for producing the same, and a method and an apparatus for recording/reproducing information thereon.

2. Description of the Prior Art

Conventionally, it is known that it is possible to cause a phase change between an amorphous phase and a crystalline phase, which have different optical constants (refractive index n and extinction coefficient k), by irradiating a thin film made of a chalcogen material formed on a substrate with a laser light beam for local heating under different irradiation conditions. Utilizing this phenomenon, a so-called phase changeable optical information recording medium has been under development.

In the phase changeable optical information recording medium, a new signal can be recorded while erasing an existing recorded signal, using only a single laser beam, by modulating the laser output between two levels of a recording level and an erasing level in accordance with the information signal and irradiating an information track with the single laser beam. This method is advantageous for recording information for the following reasons: A magnetic circuit component as required by optical magnetic recording is not required, so that the head can be simplified; and erasure and recording can be performed simultaneously, so that a period of time required for rewriting can be shortened.

In such an optical information recording medium, the following structure is common. Dielectric layers having excellent heat resistance are provided as protective layers above and below a recording layer for the purpose of preventing the evaporation of the recording layer and the thermal deformation of the substrate that might occur during repeated use. Furthermore, a reflective layer made of a metal material is provided on the protective layer on the side opposite to the substrate for the purpose of efficiently using incident light and increasing the cooling rate so as to facilitate a change to an amorphous state. Thus, in general, at least four thin films are laminated to form the optical information recording medium.

In order to produce a phase changeable optical information recording medium with high density and large capacity, the following attempts are commonly carried out: forming a smaller mark by using a shorter wavelength of the light source or a higher NA (numerical aperture) of the object lens used for recording, and thus improving the linear density in the circumferential direction and the track density in the radial direction of the recorded mark on the substrate. Furthermore, mark edge recording in which information is defined by the length of the mark has been proposed to improve the linear density, and land & groove recording in which information is recorded both on grooves for guiding laser light formed on the substrate and lands between the guide grooves has been proposed to improve the track density, and both recording methods are adopted.

Furthermore, it was proposed that a plurality of such recordable information layers are laminated via separating layers so that the capacity is increased (e.g., JP 9-212917 A, JP10-505188 A). Moreover, layer recognition means and layer switching means for selecting one of these information layers for recording and reproduction were proposed (e.g. JP10-505188 A).

Improving not only high density but also data processing rates, namely, the velocity of recording/reproducing information, is important. For this reason, improving the linear velocity by rotating a disk at a higher revolution per minute with the radius position unchanged for recording and reproduction is under research.

In such an optical information recording medium, there are some challenges for achieving good and practical signal quality and recording/reproducing characteristics, and some measures have been taken.

First, to obtain large signal amplitudes and high C/N ratios, a large change in the reflectance between crystal and amorphous portions is required. To cause a large change, it is necessary that the absolute value of the difference in the reflectance $\Delta R = Rc - Ra$ is large, where $Rc$ is the reflectance when the recording medium is crystalline, and $Ra$ is the reflectance when the recording medium is amorphous with respect to a laser light beam of wavelength $\lambda$.

In the case of overwriting with a single beam, there is a difference in the end-point temperatures between the case where the base layer before recording is amorphous and the case where it is crystalline even if irradiated with beams of the same power level, because the crystalline portion requires a latent heat of fusion. Therefore, when overwriting a signal, the shape of the mark is distorted by the influence of a signal that has been recorded before the overwriting. This mark distortion causes a drop of the erasure ratio or an increase of errors (jitters) in the time axis direction of reproducing signals. The problem caused by this phenomenon becomes more serious as higher linear velocity and higher density are achieved (e.g., Noboru Yamada, "Potential of Ge—Sb—Te Phase-Change Optical Disks for High-Data-Rate Recording", Optical Data Storage '97, Proceedings of SPIE, Vol. 3109, 28 (1997)). In order to solve this problem, a method of equalizing the end-point temperatures of the amorphous and crystalline portions irradiated with beams of the same power level was proposed (e.g., JP 1-149238A). This method requires that the absorptance ratio $Ac/Aa$ is more than 1 ($Ac/Aa > 1$), where $Ac$ is the absorptance of the recording layer when the recording layer is crystalline, and $Aa$ is the absorptance of the recording layer when the recording layer is amorphous with respect to a laser light beam of wavelength $\lambda$, in order to compensate the latent heat of fusion in the crystalline portion.

There are two ways of increasing the absolute value of $\Delta R$, namely, $Rc > Ra$, i.e., a reflectance-decrease-type in which $\Delta R$ is positive, and $Rc < Ra$, i.e., a reflectance-increase-type in which $\Delta R$ is negative. In the reflectance decrease-type, $Rc$ can be raised easily, so that the reflectance as the base can be raised, and $Ra$ can be substantially zero. Therefore, this is advantageous in that the contrast of signals can be large. On the other hand, as described above, either one of the following is necessary in order to increase $Ac/Aa$ at the same time: transmitting part of the incident light or allowing light to be absorbed by a portion other than the recording layer. This is disadvantageous in efficiently utilizing the incident light and in the degree of freedom in the optical design. On the other hand, in the reflectance-increase-type, $Ac/Aa$ can be increased at the same time when the absolute value of ΔR is increased. Therefore, it is not necessary to transmit part of the incident light or to allow light to be absorbed by a portion other than the recording layer. This is advantageous in efficiently utilizing the incident light and in the degree of freedom in the optical design.

Examples of the structure of such a reflectance-increase-type recording medium are as follows: A structure is such that at least five layers of a semitransparent optical interference layer made of Au or the like, a lower protective layer, a recording layer, an upper protective layer and a reflective layer are formed in this order on a substrate, and the absolute value of ΔR is increased by the reflectance-increase-type technique utilizing the interference effect of light, especially by the optical interference layer (e.g., JP 7-78354A, JP 7-105574A and JP 7-262607A).

In the recording medium provided with a plurality of information layers as described above, information is recorded on/reproduced from the second information layer positioned farther from the laser light incident side with light that has passed through the first information layer positioned nearer. Therefore, a high transmittance is required for the first information layer, and a high recording sensitivity and a high reflectance are required for the second information layer.

To tackle these problems, the following disk structures were proposed: a reflectance-decrease-type in which no reflective layer is included in the first information layers; and a reflectance-increase-type in which a semitransparent layer is provided in the light incident side in the second information layer. These structures provide high |ΔR| and Ac /Aa of the first information layer and the second information layer, a high transmittance of the first information layer and a high sensitivity and a high reflectance of the second information layer, and thus good recording/reproducing characteristics are obtained.

However, there are problems as follows. The calculation of the inventors of the present invention concluded that for the first information layer, the reflectance-increase-type recording medium is more advantageous in the optical design in terms of increasing |ΔR| and Ac /Aa at the same time as described above. However, in the conventional reflectance-increase-type recording medium, the recording layer and/or the reflective layer are thick, so that the transmittance is nearly zero. There is no report that a new reflectance-increase-type recording medium having a high transmittance has been developed and it is possible and effective to use the new medium as the first information layer of a multilayered recording medium.

Furthermore, it is almost impossible to increase the density higher than the current level in recording/reproduction with red laser light. Therefore, there have been efforts to improve the recording density with a smaller beam spot, using blue laser light as a new approach for increasing the density. A problem here is that the optical constants of the recording layer, namely, the refractive index n and the extinction coefficient k, depend on the wavelength. For example, Ge—Sb—Te, which is a typical recording material, has larger n and k in the crystalline state than in the amorphous state in the red light wavelength range, whereas it has a larger n in the amorphous state than in the crystalline state in the blue light wavelength range, which is opposite to the former case. Thus, for example, in the above-described structure, it is difficult to achieve large |ΔR| and Ac /Aa and large transmittance at the same time, especially in the first information layer. Not only in the blue light wavelength range, but also when other materials are used and n in the amorphous state is larger than that in the crystalline state, the same problem is caused.

SUMMARY OF THE INVENTION

Therefore, with the foregoing in mind, it is an object of the present invention to provide an optical information recording medium including a plurality of information layers having high C/N ratios and erasure ratios in high density and high linear velocity overwriting. It is another object of the present invention to provide a method for producing such an optical information recording medium, and a method and an apparatus for recording/reproducing information on the optical information recording medium.

In order to achieve the above objects, an optical information recording medium of a preferable embodiment of the present invention includes a first information layer, a separating layer, a second information layer and a second substrate in this order on a first substrate. The first information layer includes a multilayered thin film including a lower protective layer, a recording layer that changes reversibly between at least two different states detectable optically by irradiation of light beams, and an upper protective layer in this order from the side near the first substrate. The reflectance in a region (mark region) where a mark is formed by focusing the light beams incident from the first substrate side on the first information layer is higher than that in a region (space region) where no mark is formed. When the light beams incident from the first substrate side are focused on the second information layer, the ratio of the light beams that pass through the first information layer and reach the second information layer is not less than 40%.

In the above optical information recording medium, it is preferable that the region where a mark is formed is amorphous, and the region where no mark is formed is crystalline. Furthermore, it is preferable that the wavelength of the light beams is not more than 500 nm. Furthermore it is preferable that the first information layer further includes a reflective layer on the upper protective layer on the side of the separating layer. Furthermore, it is preferable that the first information layer further includes a transmittance improving layer on the reflective layer on the side of the separating layer. Furthermore, it is preferable that the first information layer further includes an interface layer at at least one interface selected from the group consisting of the interface between the lower protective layer and the recording layer and the interface between the recording layer and the upper protective layer.

Furthermore, in the above optical information medium, it is preferable that the thickness of the recording layer is from 3 nm to 10 nm. Furthermore, it is preferable that the recording layer contains at least Ge, Sb and Te. Furthermore, it is preferable that $0.10 \leq x \leq 0.50$ and $0.40 \leq z \leq 0.60$ are satisfied, when the atom ratio of Ge, Sb and Te contained in the recording layer is expressed by x:y:z (x+y+z=1).

In order to achieve the above objects, a method of a preferable embodiment of the present invention for producing an optical information recording medium including a first information layer, a separating layer, a second information layer and a second substrate in this order on a first substrate, wherein the first information layer includes a multilayered thin film including a lower protective layer, a recording layer that changes reversibly between at least two different states detectable optically by irradiation of light beams, and an upper protective layer in this order from the side near the first substrate, the reflectance in a region where a mark is formed by focusing the light beams incident from the first substrate side on the first information layer is higher than that in a region where no mark is formed, and when the light beams incident from the first substrate side are focused on the second information layer, the ratio of the light beams that pass through the first information layer and reach the second information layer is not less than 40% includes a film-formation process of laminating the first information layer on the first substrate and the second information layer on the second substrate; an initialization process of putting the first information layer and the second information layer in an initial recordable state; and a tight attachment process of attaching the first substrate and the second substrate via the separating layer in such a manner that the first information layer faces the second information layer. In the film-formation process, the recording layer is formed in an atmosphere including a rare gas and nitrogen as essential components.

In order to achieve the above objects, a method of a preferable embodiment of the present invention for recording/reproducing an optical information recording medium including a first information layer, a separating layer, a second information layer and a second substrate in this order on a first substrate, wherein the first information layer includes a multilayered thin film including a lower protective layer, a recording layer that changes reversibly between at least two different states detectable optically by irradiation of light beams, and an upper protective layer in this order from the side near the first substrate, the reflectance in a region where a mark is formed by focusing the light beams incident from the first substrate side on the first information layer is higher than that in a region where no mark is formed, and when the light beams incident from the first substrate side are focused on the second information layer, the ratio of the light beams that pass through the first information layer and reach the second information layer is not less than 40% is characterized in that the wavelength of the light beams is not more than 500 nm, and information is recorded and reproduced by forming and detecting the mark on the first information layer and the second information layer with the light beams incident from the first substrate side.

In order to achieve the above objects, an apparatus of a preferable embodiment of the present invention for recording/reproducing an optical information recording medium including a first information layer, a separating layer, a second information layer and a second substrate in this order on a first substrate, wherein the first information layer includes a multilayered thin film including a lower protective layer, a recording layer that changes reversibly between at least two different states detectable optically by irradiation of light beams, and an upper protective layer in this order from the side near the first substrate, the reflectance in a region where a mark is formed by focusing the light beams incident from the first substrate side on the first information layer is higher than that in a region where no mark is formed, and when the light beams incident from the first substrate side are focused on the second information layer, the ratio of the light beams that pass through the first information layer and reach the second information layer is not less than 40% includes a light source for generating the light beams with a wavelength of not more than 500 nm; and layer recognition means and layer switching means for forming and detecting the mark on the first information layer and the second information with the light beams incident from the first substrate side.

Thus, the present invention can provide an optical information recording medium provided with a plurality of information layers having a high C/N ratio and a high erasure ratio in high density and high linear velocity overwriting.

These and other advantages of the present invention will become apparent to those skilled in the art upon reading and understanding the following detailed description with reference to the accompanying figures.

DESCRIPTION OF THE PREFERRED EMBODIMENTS

Hereinafter, embodiments of the present invention will be described with reference to the accompanying drawings.

Figure 1:
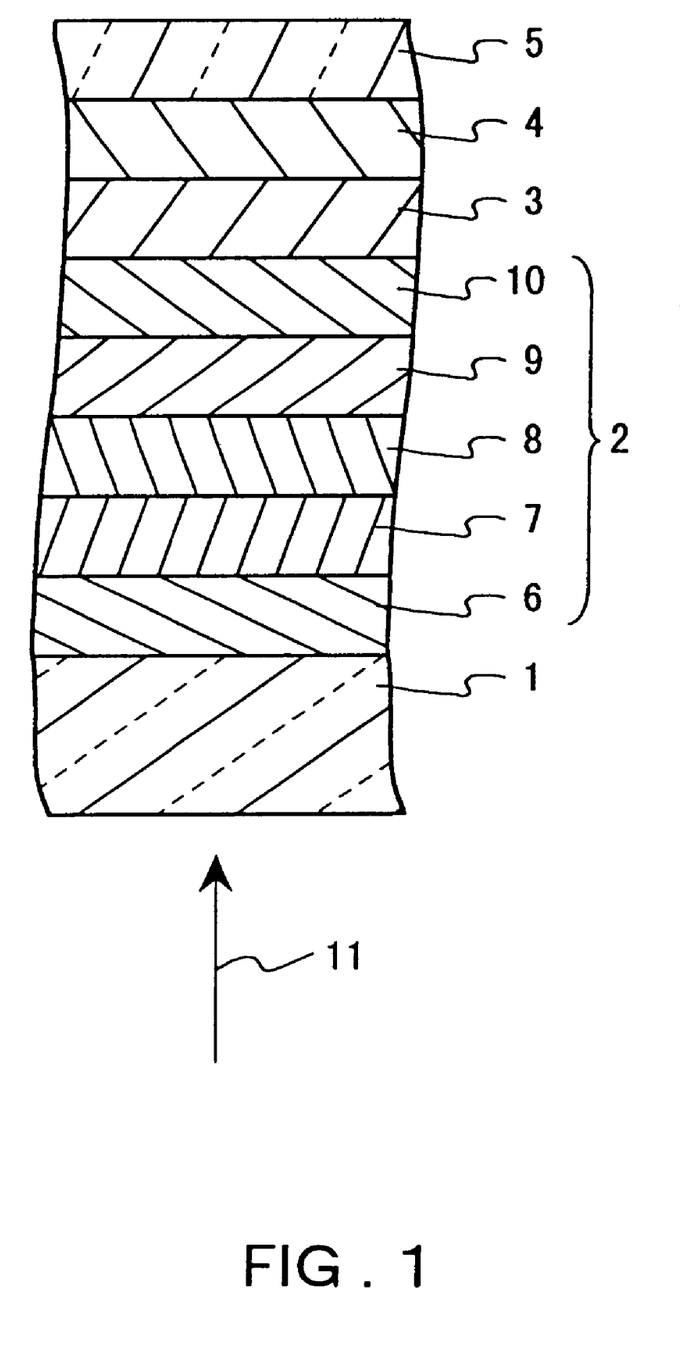
FIG. 1 is a cross-sectional view showing the structure of an embodiment of an optical information recording medium of the present invention.

As shown in FIG. 1, an embodiment of an optical information recording medium of the present invention includes a first information layer 2, a separating layer 3, a second information layer 4 and a second substrate 5 formed in this order on a first substrate 1. The first information layer 2 is a multilayered thin film including a lower protective layer 6, a recording layer 7, an upper protective layer 8, a reflective layer 9 and a transmittance improving layer 10 laminated in this order from the side near the first substrate 1. However, the reflective layer 9 and the transmittance improving layer 10 are not indispensable. In this optical information recording medium, information is recorded on and reproduced from both the first information layer 2 and the second information layer 4 by irradiation of laser light 11 from the side of the first substrate 1.

A polycarbonate resin, a polymethyl methacrylate resin, a polyolefin resin, an Arton resin (norbornene resin), glass or the like can be used as a material for the first substrate 1. The thickness of the first substrate 1 is not limited to a particular value, but preferably is about 0.05 to 2.0 mm. Furthermore, it is preferable that spiral or concentric circular grooves for the tracking of the laser light 11 have been formed on the surface of the first substrate 1 on which the films are to be formed.

The first information layer 2 is required to have a high transmittance so that recording can be performed with respect to the second information layer 4 with sufficient power, and a sufficient amount of reflected light can be obtained. When reproducing information on the second information layer 4, the laser light 11 passes through the first information layer 2 and comes back, that is, passes through the first information layer 2 twice. Therefore, the light amount of the laser light 11 is attenuated by a square of the transmittance of the first information layer 2. The reflectance required for performing servo control such as focusing and tracking with respect to the first information layer 2 and the second information layer 4 is at least 5%. Consequently, (1)

R1≧5%, and (2) R2×T²≧5% are required, where R1 and R2 are the reflectances of the first information layer 2 and the second information layer 4, respectively, and T is the transmittance of the first information layer 2. When R2 is increased, the light absorptance of the second information layer 4 is reduced, and thus resulting in poor sensitivity and insufficient recording power. For this reason, the upper limit of R2 is about 30%. Consequently, roughly T≧40% is required to satisfy (2).

Furthermore, when recording information on the second information layer 4, the laser light 11 passes through the first information layer 2 one time and reaches the second information layer 4, so that the power is attenuated. For example, the limitation of the substantial recording power of a semiconductor laser with a wavelength of 660 nm that currently is available is about 15 mW. Therefore, for example, when the transmittance of the first information layer 2 is 30%, 40% and 50%, the maximum of the substantial recording power of the light that passes through the first information layer 2 and reaches the second information layer 4 is 4.5 mW, 6.0 mW and 7.5 mW, respectively. On the other hand, the necessary recording power is at least 6 mW even if a highly sensitive recording medium is used.

In view of the above, at least 40%, more preferably 50% is required as the transmittance of the first information layer 2 for both recording and reproduction. The above description is directed to the case of the red light wavelength range. In the blue light wavelength range, the wavelength is shorter than in the red light wavelength range. In other words, the energy per photon is high, and therefore information can be recorded with a laser intensity of about ⅔, which was confirmed by experiments. However, the blue light semiconductor laser that currently has been developed has a lower limitation of its output than that of the red light semiconductor laser, for example, the output is estimated to be about ⅔. Therefore, the transmittance required for the first information layer 2 in the blue light wavelength range is about the same level as in the case of the red light wavelength range. Thus, the transmittance of the first information layer 2 is 40% or more.

The lower protective layer 6 and the upper protective layer 8 are provided for the purpose of suppressing the noise increase caused by thermal damage of the second substrate 5, the recording layer 7 or the like during irradiation of the laser light 11 and adjusting the reflectance and the absorptance with respect to the laser light 11 and the phase of reflected light. These protective layers preferably are formed of a physically and chemically stable material that has a higher melting point and a higher softening temperature than the melting point of the recording layer 7 and does not form a solid solution with the material of the recording layer 7. Specific examples of such a material include an oxide of Y, Ce, Ti, Zr, Nb, Ta, Co, Zn, Al, Si, Ge, Sn, Pb, Sb, Bi, Te or the like, a nitride of Ti, Zr, Nb, Ta, Cr, Mo, W, B, Al, Ga, In, Si, Ge, Sn, Pb or the like, a carbide of Ti, Zr, Nb, Ta, Cr, Mo, W, Si or the like, a sulfide, a selenide or a telluride of Zn, Cd or the like, a fluoride of Mg, Ca or the like, a single-element substance of C, Si, Ge or the like, or a dielectric or a quasi-dielectric material comprising a mixture of these substances. The lower protective layer 6 and the upper protective layer 8 can be formed of different materials, if necessary, or can be formed of the same material.

For the recording layer 7, it is preferable to use a material whose optical constants (refractive index n and extinction coefficient k) are changed by irradiation of laser light 11. Examples of such a material include a chalcogenide based on Te or Se, for example, alloys comprising Ge—Sb—Te, Ge—Te, Pd—Ge—Sb—Te, In—Sb—Te, Sb—Te, Ag—In—Sb—Te, Ge—Sb—Bi—Te, Ge—Sb—Se—Te, Ge—Sn—Te, Ge—Sn—Te—Au, Ge—Sb—Te—Cr, In—Se, In—Se—Co or the like as the main component, or alloys comprising these materials and nitrogen, oxygen or the like, which are added as appropriate.

When the recording layer 7 is too thin, the recording layer is cooled rapidly, which makes crystallization difficult. When it is too thick, the transmittance is reduced. In order to investigate the limitations, a ZnS—SiO$_2$ dielectric layer 100 nm thick, a Ge—Sb—Te recording layer with a varied thickness, and a ZnS—SiO$_2$ dielectric layer 100 nm thick are formed on a quartz substrate in this order by sputtering, and the obtained samples are irradiated with a semiconductor laser pulse light with a wavelength of 660 nm for observation of a change in the state of the films with a microscope. The results were that crystallization was not observed regardless of intensity or width of the pulse at thicknesses of less than 3 nm, whereas crystallization was observed in some conditions at thicknesses of 3 nm or more. Furthermore, as a result of calculation with the optical constants of Ge—Sb—Te, which will be described later, it was found that the transmittance can be 40% or more in some structures at a thickness of about 10 nm or less. In view of these results, it is preferable that the thickness of the recording layer 7 is from 3 nm to 10 nm.

The reflective layer 9 is provided for the purpose of, for example, using incident light efficiently and improving the cooling ability to facilitate a change into an amorphous state. Examples of a material for the reflective layer 9 include single element metal materials having a high heat conductivity such as Al, Au, Ag, and Cu, or alloy materials containing at least one of these materials as a main component and other appropriate elements added for the purpose of improving the resistance to humidity or adjusting the heat conductivity, such as Al—Cr, Al—Ti, Ag—Pd, Ag—Pd—Cu, and Ag—Pd—Ti. In particular, materials based on Ag have a refractive index n as low as 0.5 or less even in the blue light wavelength range, and therefore light absorption can be suppressed. For this reason, the materials based on Ag are preferable for the reflective layer of the first information layer for which a high transmittance is required. However, there are some cases, depending on recording conditions such as the linear velocity or the composition of the recording layer 7, where sufficient amorphousness can be obtained without the cooling effect of the reflective layer 9. In these cases, the reflective layer 9 can be omitted to increase the transmittance further.

The transmittance improving layer 10 is provided for the purpose of increasing the degree of freedom in the optical design such as achieving high |ΔR| and Ac/Aa and a high transmittance at the same time. The transmittance improving layer 10 preferably is formed of a transparent or substantially transparent material having a large difference in the refractive index from the reflective layer 9 (the difference in the refractive index preferably is 0.5 or more, and more preferably is 1.0 or more). For example, when the reflective layer 9 is formed of a material having a small refractive index such as an Ag alloy, dielectrics or semiconductor materials having a high refractive index (preferably 1.5 or more, and more preferably 2.0 or more) such as TiO$_2$, Si and SiC can be used. By providing such a transmittance improving layer 10, the transmittance can be higher than in the case where the transmittance improving layer 10 is not provided even if the thicknesses of the recording layer 7 absorbing light and the reflective layer 9 are unchanged. On the other hand, when the transmittance is unchanged, |ΔR| and Ac/Aa can be increased.

For the separating layer 3, it is preferable to use a material that is transparent at a wavelength λ of laser light and has high heat resistance and high adhesion to perform recording/reproducing each of the first information layer 2 and the second information layer 4 with the laser light 11. More specifically, for example, an adhesive resin such as an ultraviolet curable resin, a two-faced tape, a dielectric film or the like can be used. The thickness of the separating layer 3 is required to be more than the depth of focus, for example, 2 μm or more, to prevent signal information recorded on either one of the first information layer 2 and the second information layer 4 from disturbing recording/reproduction of signal information on the other information layer. Moreover, the total of the thickness of the separating layer and the substrate thickness is required to be within the range of the tolerance of the substrate thickness, for example, 100 μm or less, so that the laser light 11 can be focused on both the first information layer 2 and the second information layer 4.

As in the case of the first information layer 2, it is sufficient that the second information layer 4 is an information layer on which information can be recorded/reproduced with the laser light 11. However, for the second information layer 4, it is advantageous for production to use the same material as that of the first information layer 2 and include layers with thicknesses changed as appropriate. However, the structure is required to have a high recording sensitivity and a high reflectance so that information can be recorded sufficiently with the laser light 11 that is attenuated because of having passed through the first information layer 2, and a sufficient reflected light amount can be obtained.

As the second substrate 5, the same material as for the first substrate 1 can be used, or a material that is not transparent also can be used. The second substrate 5 can be different in the material, the thickness or the groove shape from the first substrate 1, and the direction of the spiral can be opposite. Furthermore, it is possible to form guide grooves for the second information layer 4 on the surface of the separating layer 3 on the side of the second information layer 4 by a 2P (photo-polymerization) method. In this case, the second substrate 5 may have grooves on the surface on the side of the second information layer 4, or may have a flat surface without grooves. The second substrate 5 can be attached to the second information 4 with an adhesive or the like, or an overcoat resin layer can be formed directly thereon to constitute the second substrate.

Figure 2:
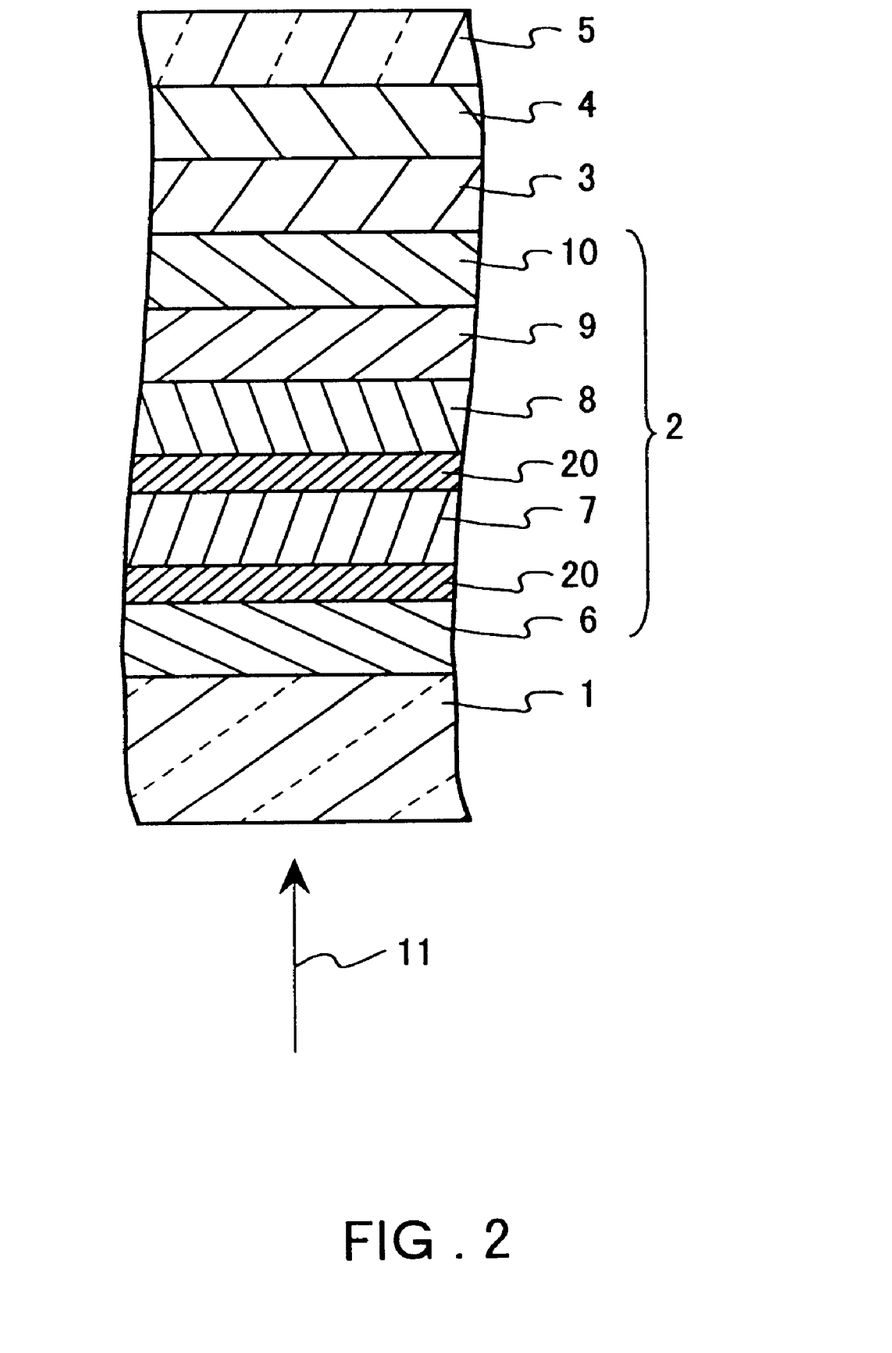
FIG. 2 is a cross-sectional view showing another embodiment of an optical information recording medium of the present invention.

In the optical information recording medium of the present invention, as shown in FIG. 2, an interface layer 20 can be provided at either one interface or both interfaces between the lower protective layer 6 and the recording layer 7 and between the recording layer 7 and the upper protective layer 8 to prevent deterioration of the characteristics due to mutual diffusion of atoms at the interfaces during repeated recording. A similar interface layer can be provided adjacent to the recording layer of the second information layer 4. As a material for the interface layer, there are some dielectric materials that can carry out its function among the materials used for the lower protective layer 6 and the upper protective layer 8. In particular, a nitride, an oxide or a carbide of Ge, Si, Al, Cr or the like, or a material comprising a mixture of these as the main component is most preferable The optical design and the optical characteristics of the optical information recording medium of the present invention will be described below. The refractive index, the extinction coefficient and the thickness of each layer of the multi-layered film are determined. With respect to all the interfaces, an equation for light energy balance at each interface is formulated based on the law of the conservation of energy, and the simultaneous equations for all the interfaces are solved, so that the reflectance and the transmittance of the entire multi-layered film with respect to the incident light beams and the absorptance of each layer can be calculated (e.g., "Wave Optics" by Hiroshi Kubota et al., Iwanami Shoten, 1971). With this approach, an optical calculation was performed with respect to the first information layer 2 including layers formed of the materials shown in Table 1 and having the refractive indexes n and the extinction coefficients k shown in Table 1 at a wavelength of the laser light of 405 nm and 660 nm.

TABLE 1

| Layer | Material | 660 nm wavelength | | 405 nm wavelength | |
|---|---|---|---|---|---|
| | | n | k | n | k |
| Separating layer | Ultraviolet curable resin | 1.6 | 0.0 | 1.6 | 0.0 |
| Reflective layer | Ag—Pd—Cu | 0.3 | 4.0 | 0.3 | 2.0 |
| Upper protective layer | ZnS—SiO$_2$ | 2.1 | 0.0 | 2.2 | 0.0 |
| Recording layer | Ge—Sb—Te (crystalline) | 4.4 | 4.0 | 1.8 | 3.2 |
| | Ge—Sb—Te (amorphous) | 4.2 | 1.5 | 3.0 | 2.0 |
| Lower recording layer | ZnS—SiO$_2$ | 2.1 | 0.0 | 2.2 | 0.0 |
| Substrate | Polycarbonate | 1.6 | 0.0 | 1.6 | 0.0 |

Table 2 shows the results in the case where the largest Ac/Aa is obtained within the range in which the average transmittance Tave is 50% or more and |ΔR| is 5% or more with an arbitrarily changed thickness of each layer.

TABLE 2

| | Reflectance-decrease-type | | Reflectance-increase-type | |
|---|---|---|---|---|
| | 660 nm wavelength | 405 nm wavelength | 660 nm wavelength | 405 nm wavelength |
| Ac/Aa | 1.20 | 0.85 | 1.50 | 1.10 |
| ΔR | 12% | 5% | 15% | 7% |
| Tave | 50% | 50% | 50% | 50% |

Herein, the average transmittance Tave is assumed to be (4Tc+Ta)/5, where Tc and Ta are the transmittances of a disk with respect to incident laser light beams when the recording layer is crystalline and amorphous, respectively, because the area ratio of the space portion (crystalline) and the mark portion (amorphous) on the surface of the recording layer 7 on which information is recorded is about 4:1. In the structures from which the results shown in Table 2 were obtained, the thickness of the recording layer 7 was 6 nm in any structures, and the thickness of the reflective layer was 10 nm in both structures of the reflectance-increase-type, and was 5 nm in both structures of the reflectance-decrease-type. According to Table 2, in the reflectance-decrease-type, Ac/Aa is as large as 1.20 at a wavelength of 660 nm in the red wavelength range, whereas Ac/Aa is as small as 0.85 at a wavelength of 405 nm in the blue wavelength range. In this case, the problems of erasure ratio deterioration and jitter increase in high linear velocity and high density overwriting, as described above, become significant.

In the reflectance-increase-type, since Rc is lower than Ra, generally Tc is higher than Ta. On the other hand, in the reflectance-decrease-type, since Rc is higher than Ra, generally Tc is lower than Ta. Since in the recording layer, the area of the crystalline portion (non-recorded portion) is larger than that of the amorphous portion (recorded mark portion) (for example, there is an about four-fold difference), it is easier to increase Tave in the reflection-increase-type where Tc is higher than Ta. In other words, the thickness of the reflective layer can be made larger in the reflectance-increase-type under the condition that Tave is the same. For example, the range of the thickness of the reflective layer that can provide Tave of 40% or more is 13 nm or less in the reflectance-increase-type, and 7 nm or less in the reflectance-decrease-type, in the above-described case where the thickness of the recording layer is 6 nm at a wavelength of 405 nm.

Furthermore, when the thickness of the reflective layer is increased, the cooling rate of the recording layer is improved. Therefore, the recording layer readily can be changed to be amorphous. Increasing the thickness of the reflective layer is advantageous also in terms of formation of recorded marks having uniform shapes.

Thus, the reflectance-increase-type can achieve high linear velocity and high density overwriting also in the blue wavelength range and can provide a high transmittance necessary for the first information layer. These results are from the calculation only with respect to two wavelengths of 660 nm and 405 nm. However, the optical constants of the layers are varied with the wavelength. Especially in the recording layer 7, the tendency that n in the crystalline portion is smaller than that in the amorphous portion is significant, and there are many cases where the ratio of n in the crystalline portion to n in the amorphous state is for example 0.8 or less, although this depends on the material. Therefore, it is particularly when the wavelength is 500 nm or less that the reflectance-increase-type is more advantageous in the optical characteristics than the reflectance-decrease-type.

Hereinafter, a method for producing the optical information recording medium of the present invention will be described. This producing method includes a film-formation process, an overcoating process, an initialization process and a tight attachment process, which basically are performed in this order.

In the film-forming process, a first information layer 2 is formed on a surface of a first substrate 1 on which guide grooves have been formed beforehand. A second information layer 4 is formed on a surface of a second substrate 5 on which guide grooves have been formed beforehand. The first information layer 2 and the second information layer 4 can be formed by a regular vapor deposition method for forming a thin film, such as vacuum deposition, sputtering, ion plating, a CVD (chemical vapor deposition) method, and an MBE (molecular beam epitaxy) method. Among these, sputtering is most preferable, because the advantages and the disadvantages in the film formation rate, the production cost and the quality of the obtained film are balanced. The films generally are formed while allowing inert gas to flow in a chamber under high vacuum. The layer may be formed while mixing oxygen, nitrogen or the like with the inert gas. Thus, oxygen atoms or nitrogen atoms are contained in the film so that the characteristics of the film or the bonding state of the atoms can be adjusted. The mixture of these atoms may be effective to improve the repetition characteristics or the resistance to humidity. In particular, it is advantageous to mix nitrogen when forming the recording layer 7, because not only are the repetition characteristics improved, as described above, but also the refractive index n and/the extinction coefficient k of the recording layer 7 can be reduced, so that the transmittance can be increased.

In the overcoating process, the first information layer 2 and the second information layer 4 are coated with an UV resin or the like by spin coating and irradiated with ultraviolet rays to cure the resin for overcoating. This process can be omitted in the case where there is no possibility that the film evaporates in the following initialization process.

In the initialization process, the entire surface is initialized, namely, crystallized by irradiating the first information layer 2 and the second information layer 4 with energetic light such as laser light from the first substrate 1 side and the overcoating side, respectively. In the case where the transmittance of the reflective layer of the second information layer is sufficiently high, it is possible to omit the previous overcoating process, perform the following tight attachment process earlier, and then initialize, namely, crystallize the entire surface by irradiating the first information layer 2 and the second information layer 4 with energy light such as laser light from the first substrate 1 side and the second substrate 5 side, respectively.

In the tight attachment process, the first substrate 1 and the second substrate 5 are attached via the separating layer 3 in such a manner that the surfaces of the overcoatings of the first information layer 2 and the second information layer 4 face each other. The attachment process, for example, is performed by applying an ultraviolet curable resin onto either one of the surfaces of the films, opposing the films with the surfaces facing each other, pressing the two substrates for tight attachment, and irradiating the substrates with ultraviolet light to cure the ultraviolet curable resin.

Figure 3:
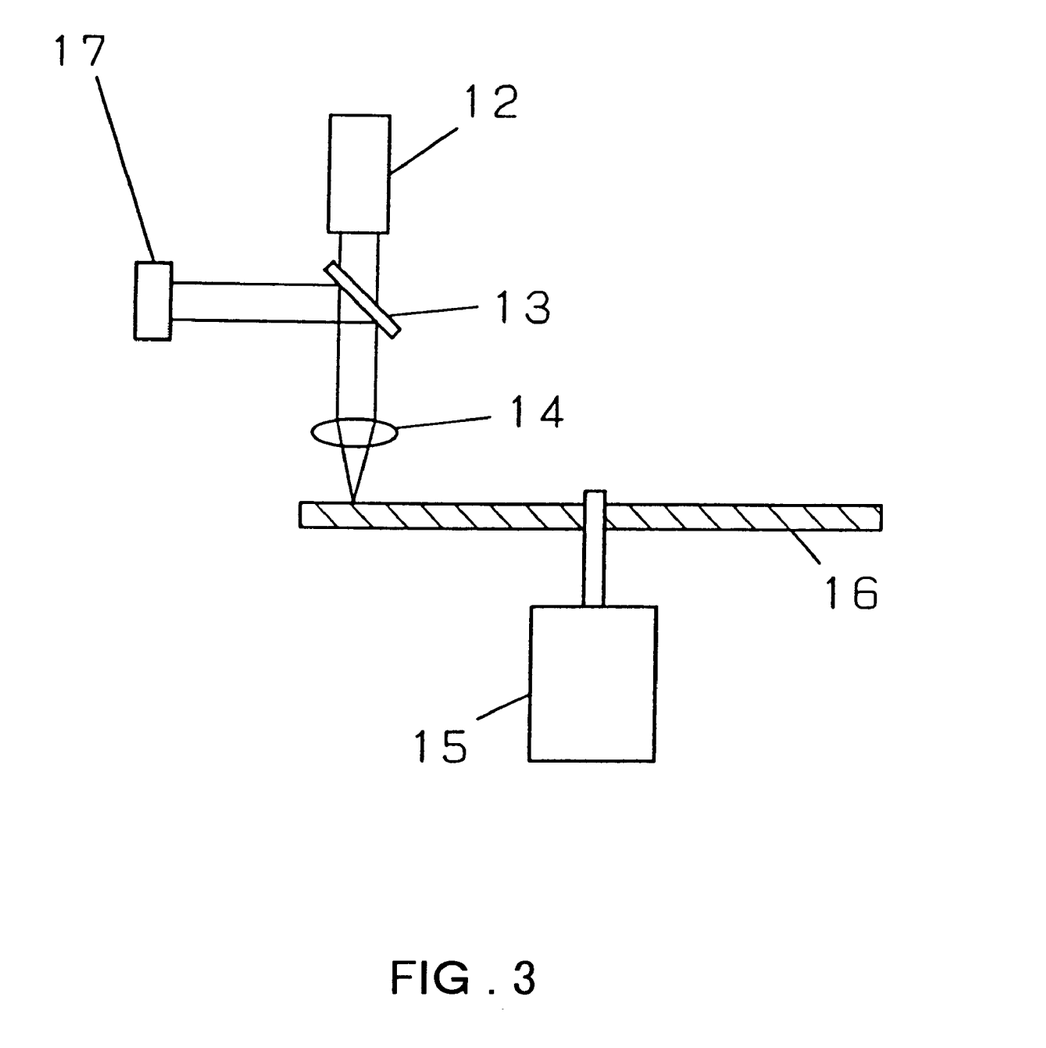
FIG. 3 is a schematic view showing the structure of an embodiment of an apparatus for recording/reproducing information on the optical information recording medium of the present invention.

FIG. 3 is a schematic view of an apparatus for performing recording/reproducing information on the optical information recording medium of the present invention. In this apparatus, the laser light 11 emitted from a laser diode 12 passes through a half mirror 13 and an object lens 14 and is focused on an optical disk 16 that is being rotated by a motor 15, so that information signals are recorded/reproduced.

Figure 4:
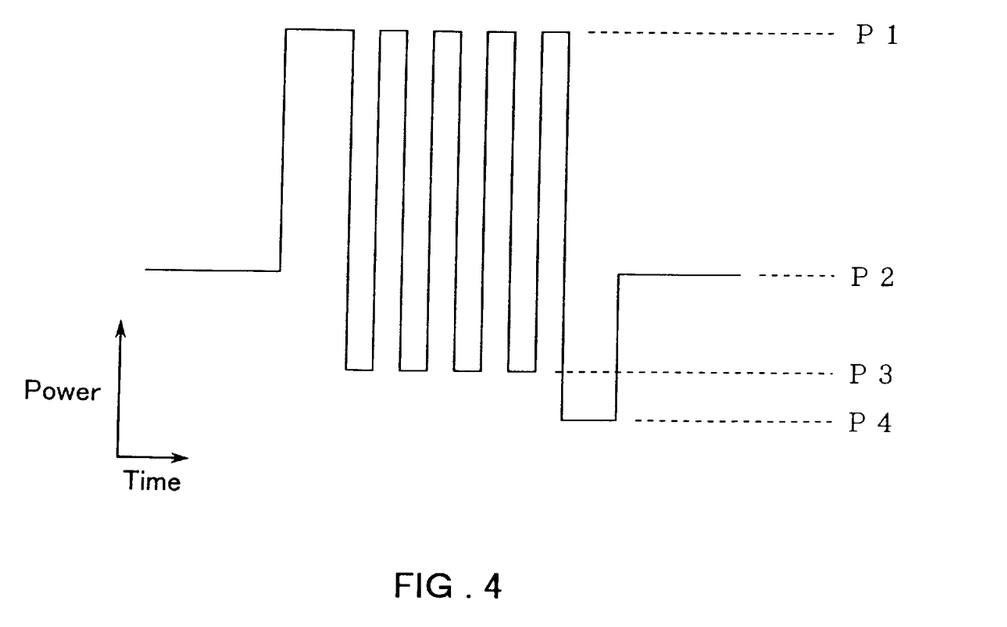
FIG. 4 is a diagram showing an example of a pulse waveform used in a method for recording/reproducing information on the optical information recording medium of the present invention.

To record information signals, the intensity of the laser light 11 is modulated with a pulse waveform shown in FIG. 4. More specifically, the intensity of the laser light 11 is modulated at least between power level P1 and power levels P2 and P3 (P1>P2≧P3≧0). Herein, laser light of the power level P1 is sufficient to melt an irradiated portion instantly when the portion is irradiated with the light. Laser light of the power levels P2 and P3 cannot melt an irradiated portion instantly when the portion is irradiated with the light. The intensity of the laser light can be modulated preferably by modulating the driving current of a semiconductor laser. Alternatively, an electro-optical modulator, an acousto-optical modulator, etc. can be used.

A single rectangular pulse of power level P1 may be sufficient for a portion where a mark is to be formed. However, especially when forming a long mark, it is preferable to use a recording pulse train having a plurality of pulses that is modulated among power levels P1, P2 and P3 for the purpose of saving excessive heat and forming uniform mark widths. The power level is kept constant at power level P2 for a portion where a mark is not to be formed or to be erased.

Furthermore, it is effective to provide a cooling section of power level P4(P2>P4≧0) immediately after the pulse train with a plurality of pulses for heat removal, especially in the rear end portion of a mark where heat readily becomes excessive, and thus for uniform mark shapes. On the other hand, for the front end portion of the mark that hardly becomes amorphous and is readily narrowed in its mark width, it is preferable to broaden the width of only the leading pulse of the plurality of pulses as shown in FIG. 4 or to make the power level higher than P1 in order to match the width of the mark at the front end with that at the rear end.

On the other hand, it is preferable that the length of each pulse of the plurality of pulses of the pulse train and the length between the pulses are constant, because the modulation can be performed with a single frequency so that the modulation means can be simplified.

Furthermore, mark edge positions may be non-uniform for each pattern of the length of a mark, the length of a space before and after the mark, and the length of an adjacent mark, thus causing an increase of jitter. In the method for recording/reproducing information on the optical information recording medium of the present invention, it is preferable to adjust and compensate the pulse position or the pulse length of the pulse train, if necessary, so as to make the edge positions uniform for every pattern in order to prevent the increase of jitter and improve the jitter.

To reproduce information signals that are recorded in this manner, the optical disk 16 is irradiated with the laser light 11 of a power level that does not allow the information recorded in the first information layer 2 and the second information layer 4 to be erased. Then, the reflected light is incident to a photodetector 17 and a change in the reflected light quantity is detected as a reproduction signal.

EXAMPLES

Hereinafter, the present invention will be described more specifically by way of example, but the present invention is not limited thereto.

A substrate made of a polycarbonate resin, having a diameter of 12 cm, a thickness of 0.58 mm, a width of a groove and a width of a land of 0.4 µm, and a groove depth of about 40 nm was used as the first substrate. As a first information layer, a lower protective layer, a recording layer, an upper protective layer and a reflective layer were formed by sputtering in this order on a surface of the first substrate provided with grooves. The lower protective layer, about 110 nm thick, was formed with a ZnS—SiO$_2$ (mole ratio of ZnS:SiO$_2$=80:20) target. The recording layer, about 6 nm thick, was formed with a Ge—Sb—Te (atom ratio of Ge:Sb:Te=29:21:50) target. The upper protective layer, about 40 nm thick, was formed with a ZnS—SiO$_2$ (mole ratio of ZnS:SiO$_2$=80:20) target. The reflective layer, about 10 nm thick, was formed with an Ag—Pd—Cu (atom ratio of 98:1:1) target.

The same substrate as above was used as a second substrate. As a second information layer, a reflective layer, an upper protective layer, a recording layer, and a lower protective layer were formed by sputtering in this order on a surface of the second substrate provided with grooves. The reflective layer, about 80 nm thick, was formed with an Ag—Pd—Cu (atom ratio of 98:1:1) target. The upper protective layer, about 40 nm thick, was formed with a ZnS—SiO$_2$ (mole ratio of ZnS:SiO$_2$=80:20) target. The recording layer, about 10 nm thick, was formed with a Ge—Sb—Te (atom ratio of Ge:Sb:Te=29:21:50) target. The lower protective layer, about 90 nm thick, was formed with a ZnS—SiO$_2$ (mole ratio of ZnS:SiO$_2$=80:20) target. In this example, the layers of the second information layer were laminated sequentially in the order from the side opposite to the laser light incident side, that is, the layer positioned farthest from the laser light incident side is formed first. For all the layers, a target having a diameter of about 10 cm and a thickness of about 6 mm was used, and Ar gas was used except for the recording layer, and a mixed gas of Ar and N$_2$ (the partial pressure of N$_2$ was about 5%) was used as the sputtering gas for film-formation.

Next, an ultraviolet curable resin was applied to the film surfaces of the first information layer and the second information layer by spin coating, and then the layers were irradiated with ultraviolet light to cure the ultraviolet curable resin for overcoating.

Then, the first information layer and the second information layer were annealed with laser light from the first substrate side and the overcoating side, respectively, so that the entire surfaces are initialized, namely, crystallized.

Finally, an ultraviolet curable resin was applied onto the surface of the overcoating of the second information layer, and the second information layer was attached to the first information layer so that the film surfaces thereof were opposed to each other. Then, the two information layers were pressed for tight attachment and irradiated with ultraviolet rays from the side of the first substrate so that the ultraviolet curable resin was cured to constitute the separating layer. Thus, a disk having two information layers was produced (disk A).

As another example of the present invention, a disk B was produced in the same manner as that for the disk A except that in the first information layer 2, a transmittance improving layer, about 40 nm thick, was formed with a TiO$_2$ target on the reflective layer, and the thickness of the upper dielectric layer was 50 nm.

Furthermore, as a comparative example, a disk C was produced in the same manner as for the disk A except that the thicknesses of the lower dielectric layer and the upper dielectric layer were 60 nm and 20 nm, respectively.

The refractive index n and the extinction coefficient k of the material of each layer are the same as those shown in Table 1. The optical characteristics of the disk A (reflectance-increase-type) and the disc C (reflectance-decrease-type) are the same as those shown in Table 2. The optical constants at a wavelength of 405 nm obtained by actual measurement were n=2.7 and k=0.0. According to the optical calculation performed in the same manner as for disk A and disk C, the values of Ac/Aa, ΔR and Tave of disk B were 1.20, 10% and 50%, respectively.

Mark edge recording was performed on these disks, using an optical system with a wavelength of 405 nm and NA of 0.6 at a linear velocity of 5 m/s and measurement was performed in the following manner. First, a 3T signal at 9.7 MHz and an 11 T signal at 2.6 MHz alternately were recorded 11 times on a groove and a land. The track with a 3T signal recorded was reproduced, and the C/N ratio and the erasure ratio were measured by a spectrum analyzer. In this measurement, an effective erasure ratio, i.e., the ratio of the amplitude of the 3T signal and the amplitude of 11T residual signal was used as the erasure ratio.

For the laser modulation wavelength for recording the signals, a single rectangular pulse with a pulse width of 51.3 ns (power level P1) was used in the case of the 3T signal. In the case of the 11T signal, a pulse train consisting of 9 pulses (power level P1) was used. In this case, the pulse width of the leading pulse was 51.3 ns, and the width of the second pulse and the subsequent pulses was 17.1 ns, and the width between the pulses (power level P3) also was 17.1 ns. Continuous light having power level P2 was used for the portion where a mark is not to be recorded. The power level was determined as follows. The power level P1 was 1.5 times the lower limit of the power that allows the C/N ratio of a recorded 3T signal to exceed 45 dB. The power levels P2 and P3 were the median in the power range that allows the erasure ratio to exceed 15 dB. The power level for reproduction was 1.0 mW for reproducing the first information layer, and 1.5 mW for reproducing the second information layer.

Table 3 shows the results of the measurement.

TABLE 3

|  | Disk A | | Disk B | | Disk C | |
| --- | --- | --- | --- | --- | --- | --- |
|  | Groove | Land | Groove | Land | Groove | Land |
| C/N ratio | 50 dB | 48 dB | 50 dB | 50 dB | 48 dB | 47 dB |
| Erasure ratio | 22 dB | 21 dB | 26 dB | 24 dB | 14 dB | 12 dB |

In the first information layer of disk A and disk B of this example, the C/N ratio was 48 dB or more, and the erasure ratio was 20 dB or more. Thus, these disks can provide sufficient and good signal quality in an application as a practical recording medium. In particular, in disk B, the erasure ratio was about 25 dB, which is even higher than that of disk A, which resulted from the effect of a larger Ac/Aa. On the other hand, in the first information layer of the disk C of the comparative example, the erasure ratio was as low as about 13 mW, although the C/N ratio was about 48 dB. Therefore, the disk C is not sufficient as a practical recording medium.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. An optical information recording medium comprising a first information layer, a separating layer, a second information layer and a second substrate in this order on a first substrate, wherein the first information layer comprises a multilayered thin film comprising a lower protective layer, a recording layer that changes reversibly between at least two different states detectable optically by irradiation of light beams, and an upper protective layer in this order from a side near the first substrate, a reflectance in a region where a mark is formed by focusing the light beams incident from the first substrate side on the first information layer is higher than that in a region where no mark is formed, and when the light beams incident from the first substrate side are focused on the second information layer, the ratio of the light beams that pass through the first information layer and reach the second information layer is not less than 40%.

2. The optical information medium according to claim 1, wherein the region where a mark is formed is amorphous, and the region where no mark is formed is crystalline.

3. The optical information medium according to claim 1, wherein a wavelength of the light beams is not more than 500 nm.

4. The optical information medium according to claim 1, wherein the first information layer further comprises a reflective layer on the upper protective layer on a side of the separating layer.

5. The optical information medium according to claim 4, wherein the first information layer further comprises a transmittance improving layer on the reflective layer on a side of the separating layer.

6. The optical information medium according to claim 1, wherein the first information layer further comprises an interface layer at at least one interface selected from the group consisting of an interface between the lower protective layer and the recording layer and an interface between the recording layer and the upper protective layer.

7. The optical information medium according to claim 1, wherein a thickness of the recording layer is from 3 nm to 10 nm.

8. The optical information medium according to claim 1, wherein the recording layer contains at least Ge, Sb and Te.

9. The optical information recording medium according to claim 8, wherein $0.10 \leq x \leq 0.50$ and $0.40 \leq z \leq 0.60$ are satisfied, when an atom ratio of Ge, Sb and Te contained in the recording layer is expressed by x:y:z (x+y+z=1).

10. A method for producing an optical information recording medium comprising a first information layer, a separating layer, a second information layer and a second substrate in this order on a first substrate, wherein the first information layer comprises a multilayered thin film comprising a lower protective layer, a recording layer that changes reversibly between at least two different states detectable optically by irradiation of light beams, and an upper protective layer in this order from a side near the first substrate, a reflectance in a region where a mark is formed by focusing the light beams incident from the first substrate side on the first information layer is higher than that in a region where no mark is formed, and when the light beams incident from the first substrate side are focused on the second information layer, the ratio of the light beams that pass through the first information layer and reach the second information layer is not less than 40%, the method comprising:

a film-formation process of laminating the first information layer on the first substrate and the second information layer on the second substrate;

an initialization process of putting the first information layer and the second information layer in an initial recordable state; and a tight attachment process of attaching the first substrate and the second substrate via the separating layer in such a manner that the first information layer faces the second information layer, wherein in the film-formation process, the recording layer is formed in an atmosphere comprising a rare gas and nitrogen as essential components.

11. A method for recording/reproducing information on an optical information recording medium comprising a first information layer, a separating layer, a second information layer and a second substrate in this order on a first substrate, wherein the first information layer comprises a multilayered thin film comprising a lower protective layer, a recording layer that changes reversibly between at least two different states detectable optically by irradiation of light beams, and an upper protective layer in this order from a side near the first substrate, a reflectance in a region where a mark is formed by focusing the light beams incident from the first substrate side on the first information layer is higher than that in a region where no mark is formed, and when the light beams incident from the first substrate side are focused on the second information layer, the ratio of the light beams that pass through the first information layer and reach the second information layer is not less than 40%, wherein a wavelength of the light beams is not more than 500 nm, and information is recorded and reproduced by forming and detecting the mark on the first information layer and the second information layer with the light beams incident from the first substrate side.

12. An apparatus for recording/reproducing information on an optical information recording medium comprising a first information layer, a separating layer, a second information layer and a second substrate in this order on a first substrate, wherein the first information layer comprises a multilayered thin film comprising a lower protective layer, a recording layer that changes reversibly between at least two different states detectable optically by irradiation of light beams, and an upper protective layer in this order from a side near the first substrate, a reflectance in a region where a mark is formed by focusing the light beams incident from the first substrate side on the first information layer is higher than that in a region where no mark is formed, and when the light beams incident from the first substrate side are focused on the second information layer, the ratio of the light beams that pass through the first information layer and reach the second information layer is not less than 40%, the apparatus comprising:

a light source for generating the light beams with a wavelength of not more than 500 nm; and layer recognition means and layer switching means for forming and detecting the mark on the first information layer and the second information with the light beams incident from the first substrate side.

* * * * *